United States Patent
Matsuo et al.

(10) Patent No.: US 6,245,463 B1
(45) Date of Patent: Jun. 12, 2001

(54) CORE BODY FOR ELECTRODE BASE OF SECONDARY CELL, PROCESS FOR MANUFACTURING THE CORE BODY, ELECTRODE BASE OF SECONDARY CELL, PROCESS FOR MANUFACTURING THE ELECTRODE BASE, AND ELECTRODE AND BATTERY USING THEM

(75) Inventors: Satoru Matsuo; Hitoshi Oomura; Hirohumi Tashiro; Katsuhito Yazaki, all of Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/066,449

(22) PCT Filed: Nov. 1, 1996

(86) PCT No.: PCT/JP96/03220

§ 371 Date: Apr. 30, 1998

§ 102(e) Date: Apr. 30, 1998

(87) PCT Pub. No.: WO97/16861

PCT Pub. Date: May 9, 1997

(30) Foreign Application Priority Data

Nov. 2, 1995 (JP) .................................................. 7/309858

(51) Int. Cl.[7] .............................. H01M 4/66; H01M 4/70
(52) U.S. Cl. ................................... 429/245; 429/241; 29/2
(58) Field of Search ..................................... 429/241, 245; 29/2; 205/271, 273, 170, 171, 181; 228/901

(56) References Cited

U.S. PATENT DOCUMENTS 2,724,733 * 11/1955 Hagspihl et al. .
4,003,753 * 1/1977 Hall ....................................... 429/199
4,105,832 * 8/1978 Sugalski ................................. 429/94
4,228,224 * 10/1980 Heredy et al. ........................ 429/112
4,293,089 * 10/1981 McCormick et al. ................ 228/215
4,460,666 * 7/1984 Dinkler et al. ........................ 429/236

* cited by examiner

Primary Examiner—Carol Chaney
(74) Attorney, Agent, or Firm—Browdy and Neimark

(57) ABSTRACT

The present invention provides a substrate for a secondary battery electrode having excellent bonding strength of a sintered porous metal to a ground metal plate so that the sintered porous metal does not peel off from the ground metal plate when the substrate for a secondary battery electrode is rolled up and fixed into a cylindrical battery.

For this purpose, a layer of metal having a melting point lower than that of the ground plate is formed at least on one side of the ground plate, and a porous layer is formed by forming a layer of powdered metal having a melting point higher than that of the layer of metal on the layer of metal and sintering the powdered metal at a temperature not less than the melting temperature of the layer of metal and not more than those of the ground plate and the powdered metal. Also, at least one side of the ground plate is boronized, and a porous layer is formed by forming a layer of powdered metal which is eutectically alloyed with boron on the boronized layer, and by sintering the powdered eutectic alloy at a temperature not less than the melting point of the eutectic alloy and not less than that of the ground plate and the powdered eutectic alloy.

20 Claims, 2 Drawing Sheets

Ni PLATED SUBSTRATE

POOR BONDING STRENGTH
( PEEL - OFF OCCURS )

Ni / Ni - P PLATED SUBSTRATE

GOOD BONDING STRENGTH
( PEEL - OFF DOES NOT OCCUR )

SINTERED METAL
GROUND PLATE

Ni PLATED SUBSTRATE
POOR BONDING STRENGTH
(PEEL-OFF OCCURS)

SINTERED METAL
GROUND PLATE

Ni/Ni-P PLATED SUBSTRATE
GOOD BONDING STRENGTH
(PEEL-OFF DOES NOT OCCUR)

CORE BODY FOR ELECTRODE BASE OF SECONDARY CELL, PROCESS FOR MANUFACTURING THE CORE BODY, ELECTRODE BASE OF SECONDARY CELL, PROCESS FOR MANUFACTURING THE ELECTRODE BASE, AND ELECTRODE AND BATTERY USING THEM

FIELD OF THE INVENTION

The present invention relates to a ground plate for a substrate of a secondary battery electrode alternatively known as an electrode current collector, and a substrate of a secondary battery electrode produced therefrom, and a secondary battery electrode and a secondary battery produced thereof.

THE BACKGROUND ART

In a nickel-cadmium secondary battery serving as a high output battery, an electrode comprising a substrate having a layer of sintered porous metal with a large surface area is used so as to generate a large current. The substrate having a layer of sintered porous metal is produced by pressing nickel powder onto a perforated steel sheet, that is, a ground plate, which is plated by nickel with a thickness of 60 to 80 $\mu$m, or by applying slurry of nickel powder to it and thereafter sintering the same at a temperature of 900 to 1100° C. in an anti-oxidizing atmosphere. In the above-mentioned temperature range, there is generated necking caused by the solid phase diffusion at the contacting portions of nickel powders with each other, and nickel powders are sintered. At the same time bonding is caused at the contacting portions between the perforated steel sheet with a nickel-plated layer and the nickel powders due to the solid phase diffusion of nickel. Thus, the substrate of a secondary battery electrode is produced by bonding the sintered porous nickel layer, which is composed of the nickel powders bonded to each other at the necking portions to form a network themselves and have about 80% of porosity, to the steel sheet or the ground plate.

However, the substrate of a secondary battery electrode of such structure, that the sintered porous metal is bonded to the ground metal plate only by the solid phase diffusion, has not enough bonding strength, so that the sintered porous metal often peels off from the ground metal plate when the substrate is rolled up and fixed into a cylindrical battery container. This peeling-off occurs particularly in the center portion of the rolled-up substrate where the roll-up radius is too small, which causes problems as shown in FIG. 1 (a) such that an active material falls off due to the peeling-off of the sintered porous metal from the ground metal plate, or the fallen active material and sintered porous metal crash through the separator, to cause a short circuit.

So far, several measures have been taken to increase the bonding strength of the sintered porous metal to the ground metal plate which constitute a substrate of a secondary battery electrode and to improve the strength of the sintered porous metal. Those are as follows:

1) A layer containing metal fiber is formed near the ground metal plate as a core material in order to increase the strength of the sintered metal (Laid Open Japanese Patent No. Sho 64-24364).
2) A layer added by cobalt or the like is formed near the ground metal plate as a core material in order to enhance the solid phase sintering and increase the strength of the sintered metal (Laid Open Japanese Patent No. Hei 5-174831).
3) A surface of the ground metal plate is roughened by etching in order to increase the contacting area thereof with the sintered metal (Laid Open Japanese Patent No. Hei 4-162360).
4) TD nickel plate is used as the ground metal plate in order to increase the anti-peeling strength of it with yttoria particle contacting nickel particle (Laid Open Japanese Patent No. Sho 61-130405).

However, these improvement skills remain within a solid phase sintering technology, and they cannot drastically increase the bonding strength of the sintered porous metal to the ground metal plate constituting a substrate of a secondary battery electrode.

The object of the present invention is to provide an electrode current collector (a ground plate for a substrate) of a secondary battery electrode and a substrate, and a secondary battery electrode and a secondary battery using the same, having sufficient bonding strength so as not to cause peeling-off of the sintered porous metal from the ground metal plate when the electrode is rolled up and fixed into a cylindrical battery container.

DISCLOSURE OF THE INVENTION

According to the present invention, a substrate having sufficient bonding strength so as not to cause the peeling-off of a sintered porous metal from a ground metal, can be produced by means of generating a small quantity of a liquid phase when the sintered porous metal is heat-bonded to the ground metal plate.

In the electrode current collector or ground plate for a substrate of a secondary battery electrode of the present invention, a metal layer having a melting point lower than that of a steel sheet is formed on at least one side of the steel sheet.

Also, a nickel layer is formed on at least one side of a steel sheet, and further a layer (if metal having a melting temperature lower than that of the nickel layer is formed on the nickel layer.

A nickel-phosphorus layer is preferable as a layer of the metal having a low melting point, and it is also preferable that a boronized layer is formed on at least one side of a steel sheet.

Also, the ground plate of the present invention has a nickel layer, formed on at least one side of a steel sheet, and further a boronized layer is formed on the nickel layer.

It is also preferable that such a ground plate has a large number of pores having small diameters.

A producing method of a ground plate for a substrate of a secondary battery electrode of the present invention is characterized in that a metal layer having a melting point lower than that of a steel sheet is formed at least on one side of the steel sheet having a large number of pores with small diameters.

Also, it is characterized in that a nickel layer is formed at least on one side of a steel sheet having a large number of pores with small diameters, and further a metal layer whose melting temperature is lower than that of nickel is formed on the nickel layer.

Further also, it is possible to form a nickel layer on a steel sheet having a large number of pores with small diameters, and further to be boronized after that.

It is preferable in the above-mentioned producing methods that the metal layer having a low melting temperature is composed of nickel-phosphorus alloy.

Further, a porous layer is formed on a ground plate for a substrate of a secondary battery electrode of the present invention.

It is preferable in the above-mentioned substrate of a secondary battery electrode that the porous layer is prepared by sintering nickel powder.

A producing method of a substrate of a secondary battery electrode of the present invention is characterized in that a porous layer is formed on a ground plate by forming a layer of metal powder having a melting point higher than that of a metal layer having a low melting point, heating it at a temperature between not less than the melting temperature of the metal layer having a low melting point and less than that of a steel sheet or the metal powder, and sintering the metal powder, and the porous layer is bonded to the ground plate at the same time.

Also, it is characterized in that a porous layer is formed on a ground plate by forming a layer of powdered metal that can be eutectically alloyed with boron, heating it at a temperature between not less than the melting temperature of the eutectically alloyed metal and less than that of a steel sheet or the metal powder, and sintering the metal powder, and the porous layer is bonded to the ground plate at the same time.

A secondary battery electrode of the present invention is characterized in that the above--mentioned substrate of an electrode has an active material impregnated therein, and a secondary battery of the present invention comprises the above-mentioned secondary battery electrode.

MOST PREFERRED EMBODIMENT OF THE INVENTION

Figure 1A:
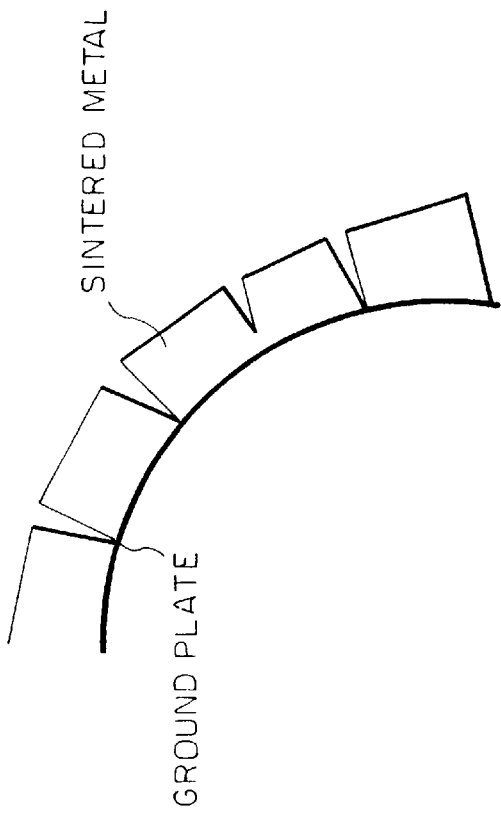
FIG. 1 (a) is a schematic view showing a conventional substrate of a secondary battery electrode, and FIG. 1 (b) is another schematic view showing a substrate of a secondary battery electrode of the present invention.

A substrate of an electrode of the present invention is prepared by forming a layer of metal having a melting point lower than that of a ground plate, for example a layer of nickel-phosphorus eutectic alloy, at least on one side of the ground plate, forming a metal powder layer on the above-mentioned metal layer, and sintering the metal powder at a temperature between not less than the melting point of the metal layer and not more than that of the metal powder to thereby form a porous layer and at the same time to bond the porous layer to the substrate.

Also, a porous layer is formed by forming a layer of powdered metal that can be eutectically alloyed with phosphorus at least on one side of a boronized ground plate, and sintering the powdered metal at a temperature between not less than the melting point of the formed eutectic alloy and not more than that of the powdered metal, whereby the porous layer is bonded to the ground plate at the same time. Thus, it is possible to produce a substrate of a secondary battery electrode having such excellent bonding strength of the porous layer to the ground plate that the porous layer does not peel off or fall off from the ground plate when the substrate is rolled up and fixed into a cylindrical battery container.

Since the substrate of an electrode of the present invention essentially has a surface area as large as possible so as to flow a large current, a steel sheet or a nickel-plated steel sheet having a thickness of 25 to 100 $\mu$m is used as a metal plate to be the ground plate for a sintered porous metal.

The metal plate to be a ground plate may be one with a large number of holes having small diameters of 1 to 3 mm formed by punching or the like, one perforated using a chemical etching process or an electro-chemical etching process, or another one having a surface mechanically roughened using a sand-blasting or using an embossed roll.

In a practical mode of the substrate of an electrode of the present invention, a layer of metal having a melting point lower than that of a ground metal plate is formed on the above-mentioned ground metal plate.

In this case, a metal layer is formed on a ground metal plate and then a porous layer is formed on it by forming a layer of powdered metal having a melting point higher than that of the metal layer and sintering the powdered metal, while the porous layer is bonded of the metal plate to thereby a melt part of metal layer and generate a liquid phase, which promotes the diffusion between the ground metal plate and the powdered metal consisting the porous layer. Thus, the metal layer essentially has a melting point lower than those of the ground metal plate and the powdered metal consisting the porous layer so as to obtain excellent bonding strength.

For example, in a case where a sintered layer composed of nickel powder as a porous layer is bonded to a ground metal plate such as a steel sheet, or a nickel-plated steel sheet, or those perforated sheets as mentioned above, nickel-phosphorus eutectic alloy and the like, prepared by a plating method are preferable as the metal layer. These eutectic alloys have melting points lower than that of pure nickel. Therefore, when the nickel powder layer formed on the eutectically layer is heated and sintered at a temperature between not less than the melting point of the eutectic alloy and not more than that of pure nickel, the eutectic alloy melts to generate a liquid phase, which promotes the diffusion between the nickel powder and the steel sheet as the ground metal plate and/or the nickel plating layer on it, thereby also promoting the strong bonding between them.

In view of productivity, electrolytical plating is preferably selected as a nickel plating method for the formation of the aforementioned nickel-plated steel sheet, and gloss plating, semi-gloss plating or mat plating using a known watt bath or a sulfamic acid bath are available. The plating thickness is preferably 0.5 to 10 $\mu$m.

Electroless plating as well as the electrolytical plating is available for the formation of the aforementioned eutectic alloy layer. However, the latter is more preferable because a required plating thickness is obtainable in a shorter period of time. As an industrial plating bath for the electrolytical nickel-phosphorus plating, a bath mainly containing nickel sulfate or nickel chloride, or a bath containing nickel sulfamide and phosphorous such as supplied from phosphorous acid, phosphoric acid, or hypo phosphorous acid, and/or phosphite, phosphate or hypophosphite is preferably used. The nickel-phosphorus plating layer has a thickness of preferably 0.5 to 10 $\mu$m. A sufficient liquid phase is not generated in the plating layer having a thickness less than 0.5 $\mu$m and the strong bonding cannot be obtained, while more than enough liquid phase is caused in the plating layer having a thickness more than 10 $\mu$m and the liquid metal penetrates into vacant spaces of the sintered metal, which causes unfavorable decrease of porosity. The content ratio of phosphorus in the plating is preferably 5 to 13 weight percent in order to generate the liquid phase.

In another practical mode of the substrate of an electrode of the present invention, a ground plate is produced by boronizing the above-mentioned steel plate or nickel-plated steel sheet, and a porous layer is formed on it by layering a powdered metal which is eutectically alloyed with the boronized layer and sintering the powdered metal at a temperature between not less than the melting point of the eutectic alloy and not more than that of the surface layer of the ground plate or that of the powdered metal. According to this producing method when the porous layer is bonded to the surface of the ground plate, a part of the metal layer melts to thereby generate a liquid phase, which promotes the diffusion between the surface of the ground plate and the powdered metal consisting the porous layer and the bonding between them is also promoted.

The detail of this case is explained below.

After a steel sheet or a nickel-plated steel sheet is boronized to be a ground plate, a porous layer composed of powdered metal is provided by forming a layer of the powdered metal which is eutectically alloyed with boron on the ground plate and sintering the powdered metal at a temperature between not less than the melting point of the eutectic alloy and not more than those of the surface layer of the ground plate or the powdered metal. The eutectic alloy melts to generate a liquid phase, which promotes the diffusion between the ground plate and the powdered metal consisting the porous layer, whereby the bonding between them is more strengthened.

For example, in a case where a steel plate is used as a ground plate and a sintering layer composed of nickel powder is bonded on the ground plate as a porous layer, the steel sheet is boronized. A layer of nickel powder is formed on the boronized layer, the nickel powder is sintered at a temperature between not less than the melting point of nickel-boron eutectic alloy and not more than that of nickel, and at the same time, a liquid phase of the nickel-boron eutectic alloy is generated on the interface between the steel sheet and the nickel powder, which promotes the diffusion between the steel sheet and the nickel powder, resulting in strong bonding. The boronized layer has a thickness of preferably 0.5 to 10 $\mu$m. The boronized layer with a thickness of less than 0.5 $\mu$m, is insufficient for producing enough eutectic alloy during the sintering period, with the result that a liquid phase is not enough generated, whereby the diffusion bonding is not enough either. On the other hand, it takes too many hours to produce a boronized layer having a thickness of more than 10 $\mu$m, which is not practical.

After forming a metal layer on the ground plate as mentioned above, a layer of metal powder is formed on it and then the metal powder is sintered to produce a sintered porous layer. Since the metal powder must be sintered at the temperature where the aforementioned metal layer melts, the metal powder essentially has a melting temperature higher than that of the metal layer. After impregnated with an active material, the sintered porous metal comes to contact alkaline electrolyte so that it should hare excellent durability to alkali. From the view points as mentioned above, nickel powder or powder of alloy mainly composed of nickel is preferable as the metal powder of particle diameter of the metal powder is suitably selected considering the porosity and the strength of the sintered layer. The coarse powder having a large particle diameter is preferable for increasing the porosity, while it has not enough strength because the contacting points of each particle per unit volume are decreased. On the other hand, a sintered porous layer composed of a fine powder having a small particle diameter has increased strength, but decreased porosity. A preferable particle diameter of the metal powder is 2 to 10 $\mu$m.

After a slurry is prepared by dispersing the metal powder into water or organic solvent with a viscous agent composed of water soluble resin or one soluble in a specified organic solvent, the slurry is applied to the metal layer formed on the aforementioned ground plate. Viscosity of the slurry is controlled by regulating the quantities of the dispersing agent, and water or the organic solvent to be added to the metal powder so as to form a uniform coat layer with a desired thickness.

After applying the slurry in which the metal powder is dispersed, into the metal layer, water or the organic solvent is dried off. After that, the ground metal plate having a layer composed of the metal powder and the dispersing agent dried off from the slurry is sintered in a reductive atmosphere. Vacuum or a mixed gas such as hydrogen and nitrogen produced by decomposing ammonia can be used as the reductive atmosphere. The sintering temperature is preferably not less than the melting temperature of the metal layer and lower than that of the metal powder by 300 to 600° C. In a case where the metal powder is pure nickel, it is preferably 900 to 1100° C.

Thus, a substrate of a secondary battery electrode to which a porous layer prepared by sintering a ground metal plate and metal powder is bonded can be manufactured.

A nickel hydroxide electrode is produced by impregnating nickel nitrate as an active material into the thus manufactured substrate of an electrode followed by dipping into sodium hydroxide aqueous solution, so as to use it as an electrode for a secondary battery.

EXAMPLES

The present invention is explained more in detail below in accordance with the examples.

Example 1

A ground plate was produced by plating on a steel sheet having a thickness of 80 $\mu$m with nickel-phosphorus alloy using a nickel-phosphorus bath having a composition as mentioned below at the current density of 10 A/dm$^2$. It was confirmed by a wet analysis method that about 10 weight % of phosphorus was contained in the thus produced nickel-phosphorus film and the melting temperature of the nickel-phosphorus alloy having this composition was about 880° C.

| [Nickel-phosphorus plating bath] | |
|---|---|
| nickel sulfate | 240 g/l |
| nickel chloride | 45 g/l |
| boric acid | 30 g/l |
| phosphorous acid | 20 g/l |
| bath temperature | 60° C. |
| pH | 1 to 1.5 |

Porous sintered nickel layers were formed on both sides of the ground plate in the following manner. At first, carboxymethyl cellulose as a viscous agent was dissolved into water and 4% solution was prepared. A slurry was prepared by dispersing nickel powder having a particle size of 2 to 3 $\mu$m in the viscous solution. The slurry was applied to both sides of the aforementioned nickel-phosphorus plated steel sheet with a coating machine, and then the moisture component was dried off in the electric oven. The nickel-phosphorus plated steel sheet coated with the slurry was heated for 15 minutes at 1000° C. in the mixed gas consisting of 25% of hydrogen and 75% of nitrogen, and then cooled off. Thus, a substrate having a porous layer of sintered nickel on one side of it was produced. The bonding strength of the porous layer of sintered nickel to the steel sheet was evaluated as follows:

The substrate having the thus produced porous layer of sintered nickel was blended at 180° angle in the bending diameter of 1 mm, 2 mm and 4 mm respectively, and the degree of the peeling-off of the porous layer of sintered nickel from the steel sheet was evaluated with the naked eye based on the following standards. The results are shown in Table 2.

Standards for evaluation

⊚: Cracks were caused in the sintered nickel layer but no peeling-off was observed.

○: Cracks were caused in the sintered nickel layer and a little peeling-off was observed in the center portion of the bending.

Δ: Cracks were caused in the sintered nickel layer and peeling-off was observed in considerable portion of the bending.

×: Cracks were caused in the sintered nickel layer and peeling-off was observed in the whole portion of the bending.

Examples 2 to 4

A nickel plating layer of 2 μm was formed on a steel sheet having a thickness of 80 μm using a Watt bath having a composition as mentioned below at the current density of 10 A/dm$^2$.

Further, a nickel-phosphorus plating layer having the thickness as shown in Table 2 was formed on the nickel plating layer in the same manner as that of Example 1.

Thus, a ground plate was manufactured.

| [Watt bath] | |
|---|---|
| nickel sulfate | 300 g/l |
| nickel chloride | 45 g/l |
| boric acid | 30 g/l |
| bath temperature | 50° C. |
| pH | 4 to 4.5 |

The same porous sintered nickel layers as that of Example 1 were formed on both sides of the ground plate in the same manner as that of Example 1. With regard to the substrate in this case having the porous layer of sintered nickel thus prepared, the degree of the peeling-off of the sintered nickel layer from the nickel-plated steel sheet having a large number of holes as a ground plate was evaluated by the observation with the naked eye based in the same manner as that of Example 1, to thereby evaluate the bonding strength of the sintered nickel layer to the nickel plated steel sheet. The results are shown in Table 1.

Examples 5 to 7

A nickel plating layer of 4 μm was formed on a steel sheet having a thickness of 80 μm using a sulfamic acid bath having a composition as mentioned below at the current density of 10 A/dm$^2$.

Further, a nickel-phosphorus plating layer was formed on the nickel plating layer using the same nickel-phosphorus plating bath in the same manner as that of Example 1. Thus, a ground plate was manufactured.

| [Sulfamic acid bath] | |
|---|---|
| nickel sulfamide | 400 g/l |
| nickel chloride | 20 g/l |
| boric acid | 30 g/l |
| Sodium lauryl sulfate | 0.5 g/l |
| bath temperature | 50° C. |
| pH | 4 |

The same porous sintered nickel layers as that of Example 1 were formed on both sides of the ground plate in the same manner as that of Example 1. With regard to the substrate in this case having the porous layer of sintered nickel thus prepared, the degree of the peeling-off of the sintered nickel layer from the nickel-plated steel sheet having a large number of holes as a ground plate was evaluated by the observation with the naked eye based in the same manner as that of Example 1, to thereby evaluate the bonding strength of the sintered nickel layer to the nickel plated steel sheet. The results are shown in Table 2.

Example 8

A nickel plating layer and a nickel-phosphorus plating layer were formed on either sides of a steel sheet in the same manner as that of Example 5, and then a large number of holes having small diameters were punched in the above mentioned plating layers using a punching press (punching steel sheet). Further, porous layers of sintered nickel were formed on both sides of the steel sheet in the same manner as that of Example 1 to thereby prepare a substrate.

With regard to the substrate in this case having the porous layer of sintered nickel thus repaired, the degree of the peeling-off of the sintered nickel layer from the ground plate was evaluated by the observation by the naked eye in the same manner as that of Example 1, to thereby evaluate the bonding strength of the sintered nickel layer to the nickel plated steel sheet. The results are shown in Table 2.

Example 9

A nickel plating layer of 4 μm was formed on a steel sheet as the same as that of Example 1 having a thickness of 80 μm using a sulfamic acid bath. A boronized layer was formed on the surface of the nickel plated steel sheet by burying the same in a pot filled with boron powder, and then heating the same for 1 hour at the temperature of 950° C. in the mixed gas consisting of 25% of hydrogen and 75% of nitrogen, Thus, a ground plate was obtained. It was confirmed by the cross-section observation that the thickness of the boronized layer was about 2 μm. The same slurry as that of Example 1 was applied in the same manner as that of Example 1 to one side of the boronized steel sheet, and the moisture component was dried off. The boronized steel sheet coated with the slurry was heated for 30 minutes at the temperature of 1150° C., in the mixed gas of 25% of hydrogen and 75% of nitrogen, and thereafter cooled off. Thus, a substrate having a porous layer of sintered nickel formed on one side thereof was obtained. With regard to the substrate thus produced, the degree of the peeling-off of the sintered nickel layer from the steel sheet as a ground plate was evaluated by the naked eye observation in the same manner as that of Example 1, thereby evaluating the bonding strength of the sintered nickel layer to the steel sheet. The results are shown in Table 2.

Examples 10 to 14

A nickel plating layer having the thickness as shown in Table 1 was formed on a steel sheet having thickness of 60

μm in which a large number of tiny holes were formed (perforated steel sheet) using a sulfamic acid bath having a composition mentioned below at the current density of 10 A/dm$^2$.

| [Sulfamic acid bath] | |
|---|---|
| nickel sulfamide | 400 g/l |
| nickel chloride | 20 g/l |
| boric acid | 30 g/l |
| Sodium lauryl sulfate | 0.5 g/l |
| bath temperature | 50° C. |
| pH | 4 |

A nickel-phosphorus plating layer was formed on the steel sheet using the same nickel-phosphorus plating bath as that of Example 1. Thus, the ground plates having thicknesses as shown in Table 1 were obtained. And then, a nickel slurry was applied to it in the same manner as that of Example 1 and the moisture component was dried off. The ground plate coated with the slurry was sintered in the same manner as that of Example 1, thereby producing a substrate having a porous layer of sintered nickel. With regard to the substrate thus produced, the degree of the peeling-off of the sintered nickel layer from the steel sheet as a ground plate was evaluated by the naked eye observation in the same manner as that of Example 1, thereby evaluating the bonding strength of the sintered nickel layer to the steel sheet. The results are shown in Table 2.

Comparative Examples 1, 2

Nickel plating layers having a thickness as shown in Table 1 were formed on both sides of the steel sheet in the same manner as that of Example 1 using a sulfamic acid bath as shown in Examples 5 to 7. But a nickel-phosphorus plating such as carried out in the cases of Examples 1 to 8 was not formed. And then, a porous layer of sintered nickel was formed in the same manner as that of Example 1. With regard to the thus produced steel sheet having the porous layer of sintered nickel, the degree of the peeling-off of the sintered nickel layer from the steel sheet was evaluated by the naked eye observation based on the same standards as shown in the above Examples to thereby evaluate the bonding strength of the sintered nickel layer to the steel sheet. The results; are shown in Table 2.

Comparative Examples 3, 4

Nickel plating layers having thicknesses as shown in Table 1 were formed on both sides of the same perforated steel sheet as that of Examples 10 to 14 using the same sulfamic acid bath as the aforementioned. But a nickel-phosphorus plating such as carried out in Examples was not formed. And then, a porous layer of sintered nickel was formed in the same manner as that of the Examples. With regard to the thus produced steel sheet having the porous layer of sintered nickel, the degree of the peeling-off of the sintered nickel layer from the steel sheet was evaluated by the naked eye observation based on the same standards as shown in the above Examples, to thereby evaluate the bonding strength of the sintered nickel layer to the steel sheet. The results are shown in Table 1. And all these results are shown in Table 2.

Figure 1B:
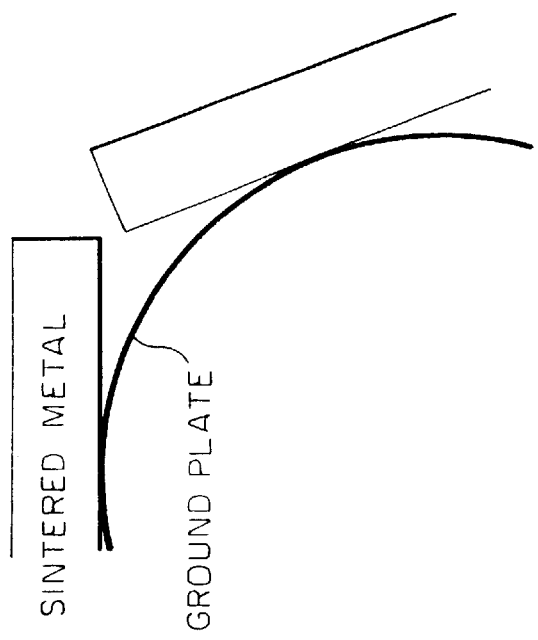

As shown in FIG. 1, since the substrate having the ground plate of the present invention has excellent bonding strength of the sintered porous layer to the ground plate; peeling-off or falling-off of the sintered porous layer is scarcely caused when the substrate is subjected to a bending work.

The evaluation of the electrode performance

The substrate of Example 3 was dipped into an aqueous solution of nickel nitrate under reduced pressure so that nickel nitrate is impregnated into the porous layer of the sintered nickel. After that, the aforementioned porous layer of the sintered nickel was treated in an aqueous solution of 25 weight % of sodium hydroxide so that the nickel nitrate is made into nickel hydroxide. Thus, an electrode was obtained. An electrode of the substrate according to Comparative Example 1 was obtained in the same manner.

The charging and discharging characteristics obtained in a case, where the secondary battery electrode of the present invention was used as a positive electrode in an aqueous solution of 6 normal of potassium hydroxide, was measured under a constant current (discharging ratio:3C) using a nickel mesh as a counter electrode and a silver chloride electrode as a reference electrode.

Figure 2:
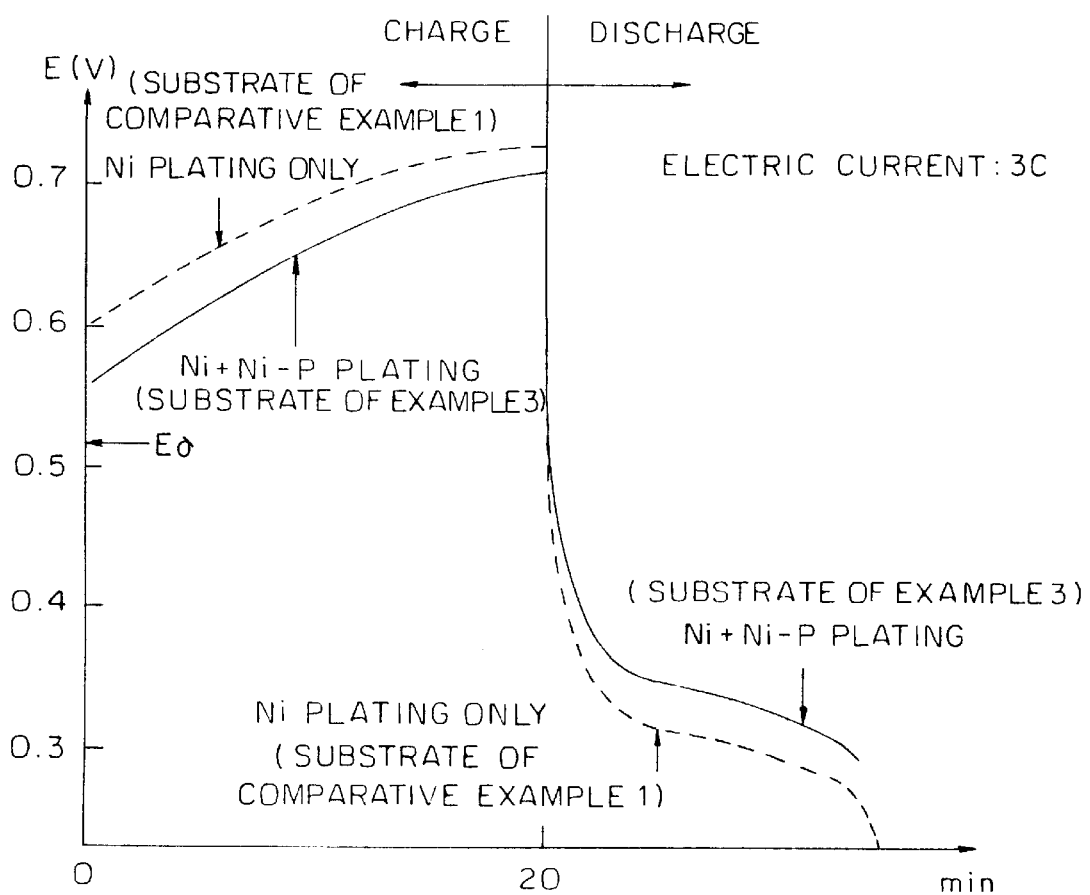
FIG. 2 is a graphic view showing charging and discharging characteristics obtained in case where a battery is charged and discharged using the secondary battery electrode, to which a substrate of a secondary battery electrode of the present invention is applied, as a positive electrode.

The measurement results obtained from one case where the electrode comprising the substrate of Example 3 (the present invention) was used and from the other case where the electrode comprising the substrate of Comparative Example 1 (conventional) was used are shown in FIG. 2. As shown in FIG. 2, the battery using the electrode comprising the ground plate and the substrate of the present invention was little polarized and showed an excellent charging and discharging characteristics.

This is because the substrate of a secondary battery electrode of the present invention has a porous layer having excellent bonding strength to a ground plate.

POSSIBILITY OF USE IN INDUSTRY

In the substrate of a secondary battery electrode of the present invention, since a sintered porous metal has excellent bonding strength to a ground metal plate, the sintered porous layer does not peel off even when the substrate is subjected to a severe work such as bending.

Also, since the ground plate of the present invention has a porous layer formed on it by forming a metal powder layer on its plating layer and sintering the same, whereby the sintered porous layer has excellent bonding strength to the ground plate, the sintered porous layer does not peel off even when the ground plate is severely formed such as in bending.

Further, since the ground plate of the present invention is a sheet having a large number of holes produced by punching a steel sheet having a plating layer, the sintered porous layer has excellent bonding strength to the ground plate after forming a metal powder layer on the plating layer and sintering them and the sintered porous layer does not peel off even when it is severely formed such as in bending.

Still further, since the ground plate of the present invention has a boronizing layer, and a metal powder layer is formed on the boronizing layer and is sintered, the sintered porous layer has excellent bonding strength to the ground plate even when it is formed and the sintered porous layer does not peel off even when it is severely formed such as in bending, similarly to the case where a nickel-phosphorus plating layer is formed on the ground plate.

Since the ground metal plate is a punched steel sheet and is characterized in that at least one side of the punched steel sheet is boronized, a layer of powdered metal which is eutectically alloyed with boron is formed on it, a porous layer is formed by sintering at a temperature not less than the melting temperature of the eutectic alloy and not more than those of the ground metal sheet and the powdered metal, and the porous layer is bonded to the ground metal plate at the same time, the porous layer formed by sintering the layer of powdered metal to the ground metal plate has excellent bonding strength to the ground metal plate and the sintered porous layer does not peel off even when it is severely formed such as in bending.

Still further, since the porous layer is produced by sintering nickel powder and the diffusion between the porous layer and the ground plate is promoted by the melting of a layer of metal with a low melting temperature at the time of sintering, the porous layer has excellent bonding strength to the ground plate and the sintered porous layer does not peel off even when it is severely formed such as in bending. Also, since nickel has excellent durability to alkali, the substrate of a secondary battery electrode of the present invention has excellent corrosion resistance when it contacts alkaline electrolyte.

Sill further, the electrode of the present invention is produced by impregnating an active material into any of the aforementioned substrates for an electrode, and the secondary battery using the electrode of this invention shows excellent charging and discharging characteristics.

TABLE 1

| Sample | Sheet | Ni plating thickness | Ni-P plating thickness | Remarks |
|---|---|---|---|---|
| Example 1 | 80 μm steel sheet | — | 2 μm | |
| Example 2 | 80 μm steel sheet | 2 μm | 1 μm | |
| Example 3 | 80 μm steel sheet | 2 μm | 2 μm | |
| Example 4 | 80 μm steel sheet | 2 μm | 4 μm | |
| Example 5 | 80 μm steel sheet | 4 μm | 2 μm | |
| Example 6 | 80 μm steel sheet | 4 μm | 4 μm | |
| Example 7 | 80 μm steel sheet | 4 μm | 6 μm | |
| Example 8 | 80 μm steel sheet | 4 μm | 2 μm | punched after being plated boronized |
| Example 9 | 80 μm steel sheet | 4 μm | — | |
| Example 10 | 60 μm punched steel sheet | 2 μm | 1 μm | |
| Example 11 | 60 μm punched steel sheet | 2 μm | 2 μm | |
| Example 12 | 60 μm punched steel sheet | 4 μm | 2 μm | |
| Example 13 | 60 μm punched steel sheet | 4 μm | 4 μm | |
| Example 14 | 60 μm punched steel sheet | 4 μm | 6 μm | |
| Comparative Example 1 | 80 μm steel sheet | 2 μm | — | |
| Comparative Example 2 | 80 μm steel sheet | 4 μm | — | |
| Comparative Example 3 | 60 μm punched steel sheet | 2 μm | — | |
| Comparative Example 4 | 60 μm punched steel sheet | 4 μm | — | |

TABLE 2

Evaluation of bonding strength of sintered nickel layer to ground plate

| | Evaluation of the bonding strength after bending at 180° angle | | |
|---|---|---|---|
| Sample | Bending diameter 1 mm | Bending diameter 2 mm | Bending diameter 2 mm |
| Example 1 | ○ | ◎ | ◎ |
| Example 2 | ○ | ◎ | ◎ |
| Example 3 | ○ | ◎ | ◎ |
| Example 4 | ◎ | ◎ | ◎ |
| Example 5 | ○ | ◎ | ◎ |
| Example 6 | ◎ | ◎ | ◎ |
| Example 7 | ◎ | ◎ | ◎ |
| Example 8 | ○ | ◎ | ◎ |
| Example 9 | Δ | ○ | ◎ |
| Example 10 | ○ | ◎ | ◎ |
| Example 11 | ○ | ◎ | ◎ |
| Example 12 | ○ | ◎ | ◎ |
| Example 13 | ◎ | ◎ | ◎ |
| Example 14 | ◎ | ◎ | ◎ |
| Comparative Example 1 | X | Δ | ○ |
| Comparative Example 2 | X | Δ | ○ |
| Comparative Example 3 | Δ | ○ | ○ |
| Comparative Example 4 | Δ | ○ | ○ |

What we claim is:

1. An electrode current collector of a secondary battery electrode comprising a steel sheet, a boronized layer formed on at least on one side of said steel sheet, and a porous nickel layer adhered to said steel sheet through said boronized layer of metal.

2. The electrode current collector of claim 1 wherein said steel sheet has a plurality of holes having diameters of 1–3 mm.

3. The electrode current collection according to claim 1, in the form of a coil.

4. An electrode current collector of a secondary battery electrode comprising a steel sheet, a first nickel layer formed at least on one side of said steel sheet, a fused layer of metal having a melting point lower than that of said nickel layer formed on said nickel layer, and a porous nickel layer adhered to said first nickel layer through said fused layer of metal, wherein said fused metal layer is a boronized layer.

5. The electrode current collector of claim 4 wherein said steel sheet has a plurality of holes halving diameters of 1–3 mm.

6. An electrode current collector of a secondary battery electrode comprising a steel sheet, a first nickel-layer formed at least on one side of said steel sheet, a fused layer of metal having a meeting point lower than that of said nickel layer formed on said nickel layer, and a porous nickel layer adhered to said first nickel layer through said fused layer of metal, in the form of a coil.

7. A secondary battery electrode substrate comprising a steel sheet;

optionally a first nickel layer formed on at least one side of said steel sheet;

a boronized layer formed over said steel sheet on at least one side thereof or over said optional first nickel layer when present; and a porous sintered nickel layer adhered to said steel sheet or said optional nickel layer when present, through said boronized layer.

8. The electrode substrate of claim 7, wherein said steel plate has a plurality of holes of 1–3 mm in at least one surface thereof, said holes optionally extending therethrough.

9. In a secondary battery comprising a secondary battery electrode, said secondary battery electrode comprising an electrode substrate impregnated with an active material, the improvement wherein said an electrode substrate is the substrate of claim 8.

10. In a secondary battery comprising a secondary battery electrode, said secondary battery electrode comprising an electrode substrate impregnated with an active material, the improvement wherein said an electrode substrate is the substrate of claim 7.

11. The electrode substrate of claim 7, in the form of a coil.

12. An electrode current collector of a secondary battery electrode comprising a steel sheet, a first nickel layer formed at least on one side of said steel sheet, a fused layer of metal having a melting point lower than that of said nickel layer formed on said nickel layer, and a porous nickel layer adhered to said first nickel layer through said fused layer of metal, wherein said fused metal is a layer of nickel-phosphorous, and wherein said steel sheet has a plurality of holes having diameters of 1–3 mm.

13. A secondary battery electrode substrate comprising:
a steel sheet;
a boronized layer formed at least on one side of said steel sheet; and
a porous sintered nickel layer adhered to said steel sheet through said boronized layer.

14. In a secondary battery comprising a secondary battery electrode, said secondary battery electrode comprising a substrate impregnated with an active material, the improvement wherein said substrate is the substrate of claim 13.

15. A secondary battery electrode substrate comprising:
a steel sheet;
a first nickel layer formed at least on one side of said steel sheet;
a fused layer of metal formed over said first nickel layer, said fused layer of metal having a melting point lower than that of said steel sheet and said nickel layer; and
a porous sintered nickel layer adhered to said nickel layer through said fused layer of metal,
wherein said fused metal layer is a boronized layer.

16. In a secondary battery comprising a secondary battery electrode, said secondary battery electrode comprising a substrate impregnated with an active material, the improvement wherein said substrate is the substrate of claim 15.

17. An electrode substrate comprising:
a steel sheet;
a first nickel layer formed at least on one side of said steel sheet;
a fused layer of metal formed over said first nickel layer, said fused layer of metal having a melting point lower than teat of said steel sheet and said nickel layer; and
a porous sintered nickel layer adhered to said nickel layer through said fused layer of metal,
said substrate being in the form of a coil.

18. In a secondary battery comprising a secondary battery electrode, said secondary battery electrode comprising a substrate impregnated with an active material, the improvement wherein said substrate is a secondary battery electrode substrate comprising:
a steel sheet;
a first nickel layer formed at least on one side of said steel sheet;
a fused layer of metal formed over said first nickel layer, said fused layer of metal having a melting point lower than that of said steel sheet and said nickel layer; and
a porous sintered nickel layer adhered to said nickel layer through said fused layer of metal.

19. In a secondary battery comprising a secondary battery electrode, said secondary battery electrode comprising a substrate impregnated with an active material, the improvement wherein said substrate is a secondary battery electrode substrate comprising:
a steel sheet;
a first nickel layer formed at least on one side of said steel sheet;
a fused layer of metal formed over said first nickel layer, said fused layer of metal having a melting point lower than that of said steel sheet and said nickel layer; and
a porous sintered nickel layer adhered to said nickel layer through said fused layer of metal,
wherein said fused metal layer is a layer of nickel phosphorous.

20. An electrode current collector of a secondary battery electrode comprising a steel sheet having a plurality of holes having diameters of 1–3 mm, a first nickel layer formed at least on one side of said steel sheet, a fused layer of metal having a melting point lower than that of said nickel layer formed on said nickel layer, and a porous nickel layer adhered to said first nickel layer through said fused layer of metal.

* * * * *